United States Patent [19]

Kitzmiller

[11] Patent Number: 5,244,610
[45] Date of Patent: Sep. 14, 1993

[54] ROTARY PLASTIC BLOW MOLDING

[75] Inventor: Michael C. Kitzmiller, Fort Laramie, Ohio

[73] Assignee: Plastipak Packaging, Inc., Plymouth, Mich.

[21] Appl. No.: 837,236

[22] Filed: Feb. 14, 1992

[51] Int. Cl.⁵ .................. B29C 49/36; B29C 49/78
[52] U.S. Cl. ....................... 264/40.1; 264/40.3; 264/40.5; 264/40.6; 264/40.7; 264/543; 425/135; 425/139; 425/144; 425/145; 425/149; 425/150; 425/540
[58] Field of Search .............. 264/40.1, 40.7, 543, 264/40.3, 40.5, 40.6; 425/135, 540, 532, 149, 140, 143, 144, 145, 150, 139; 364/473, 476

[56] References Cited

U.S. PATENT DOCUMENTS

| | | | |
|---|---|---|---|
| 3,310,834 | 3/1967 | Simpson et al. | 18/5 |
| 3,759,648 | 9/1973 | Hunkar | 264/40.7 |
| 3,764,250 | 10/1973 | Waterloo | 425/326 |
| 3,854,855 | 12/1974 | Pollock et al. | 425/145 |
| 3,943,214 | 3/1976 | Turek | 264/40.7 |
| 4,698,012 | 10/1987 | Shelby et al. | 425/526 |
| 4,861,542 | 8/1989 | Oles et al. | 264/543 |
| 5,062,052 | 10/1991 | Sparer et al. | 425/135 |
| 5,185,109 | 2/1993 | Habig et al. | 264/40.1 |

Primary Examiner—Catherine Timm
Attorney, Agent, or Firm—Brooks & Kushman

[57] ABSTRACT

A rotary plastic blow molding machine (20) including a base (22), a wheel (24) mounted for rotation on the base about a rotational axis A and a programmable logic controller (PLC) (100) mounted on the wheel for rotation therewith to control operation of a plurality of mold stations (40) on the wheel. The blow molding machine (20) as disclosed also has at least one sensor (62) mounted on the wheel (24) for rotation therewith to sense an operating parameter of each mold station and to generate an associated operation signal. The PLC (100) is coupled to the at least one sensor (62), processes the sensed operation signal and controls the machine (20) operation in response to the signal.

21 Claims, 12 Drawing Sheets

ROTARY PLASTIC BLOW MOLDING

TECHNICAL FIELD

The present invention is related to a plastic blow molding machine of the wheel type.

BACKGROUND ART

In many wheel type blow molding machines of the prior art, mechanical hardware, such as cams, are utilized to control various aspects of the blow molding operation, such as the opening and closing of the mold halves. This type of mechanical hardware requires frequent adjustments as these machines are operated to fine tune operation and insure product quality.

Typically, these adjustments are required from the very first machine cycle and thereafter throughout the life of the molding machine to compensate for wearing of the cams, loosening of tolerances and the like. These adjustments, however necessary, require the operator to shut down the blow molding machine. Since these blow molding machines are typically operated continuously, any downtime results in significant financial losses.

For example, U.S. Pat. Nos. 3,310,834, Simpson et al., and 3,764,250, Waterloo, each disclose a plastic blow molding machine including a wheel having a frame supported on a base for rotation about a horizontal axis with a plurality of mold stations mounted on the wheel frame about the rotational axis such that a pair of mold supports for respectively mounting a pair of mold portions move parallel to the rotational axis between open and closed positions of the mold. Such blow molding machines conventionally include a closing station where the mold supports move the mold portions to a closed position to enclose an extruded hot plastic parison within a mold cavity for blowing to the shape of the mold and for subsequent cooling prior to opening at an opening station after approximately ¾ of a revolution of the wheel.

Also, U.S. Pat. No. 4,698,012, Shelby et al., discloses a multi-station rotary blow molding machine having a plurality of separable blow molds angularly arranged in a serial fashion in a circular array within the machine. Each mold comprises a pair of mold sections, each of which has an internal cavity such that the mold sections, when joined, defining the external configuration of a molded article. The mold sections are mounted in the mold frame for movement toward and away from each other in a direction generally parallel to the axis of the mold frame central shaft and are separately opened and closed as necessary during molding or cleaning operations. The mold sections are opened and closed utilizing a cam arrangement including a cam attached to the stationary support frame, a cam follower associated with each pair of mold sections and carried by the rotary mold frame and a linkage for linking each of the cam followers to its respective mold section.

DISCLOSURE OF INVENTION

An object of the present invention to provide a plastic blow molding machine of the wheel type having a plurality of mold stations disposed around the rotational axis of the wheel and being electronically controlled.

In carrying out the above object and other objects of the present invention, a plastic blow molding machine is provided including a base and a wheel mounted for rotation on the base about a rotational axis. The wheel includes a plurality of mold stations positioned on the wheel about the rotational axis and each mold station includes a mold movable between an open position to receive a hot plastic parison and a closed position where the parison is enclosed within the mold for blow molding. The blow molding machine further includes programmable logic means mounted on the wheel for rotation therewith and coupled with the mold stations to control the machine operation.

Preferably, the plastic blow molding machine further comprises at least one sensor for sensing a wheel operating parameter as the wheel rotates during operation of the machine. Also preferably, the plastic blow molding machine further includes sensing means mounted on the wheel for rotation therewith and coupled with the programmable logic means, to sense at least one operating parameter of each mold station upon rotation of the wheel on the base and to generate an associated operation signal. The programmable logic means processes the sensed operation signal and controls the machine operation in response to the signal.

The plastic blow molding machine also preferably further includes a rotary coupling between the base and the wheel, and control means located on the base side of the rotary coupling. The control means is operable to provide at least one electrical control signal through the rotary coupling to the programmable logic means on the wheel to control the machine operation. The control means can include a machine operator console and most preferably includes an operator console and a second programmable logic means.

The plastic blow molding machine also includes actuating means controlled by the programmable logic means and the control means for operating the blow molding machine. The sensing means preferably includes at least one transducer and at least one proximity switch.

In further carrying out the above object and other objects of the present invention, a method for controlling a plastic blow molding machine including a base and a wheel mounted for rotation on the base about a rotational axis, the wheel including a plurality of mold stations positioned about the rotational axis. The method is performed by rotating the wheel with a programmable logic means mounted thereon for rotation therewith and generating at least one electrical operation signal based on an associated mold station operating parameter. The method also involves processing the electrical operation signal by the programmable logic means mounted on the wheel as well as involving controlling the machine operation by the programmable logic means in response to the processed electrical operation signal.

Preferably, the wheel is rotated with a rotary coupling between the base and the wheel, and a control means located on the base side of the rotary coupling is operated to provide an electrical control signal through the rotary coupling to the programmable logic means on the wheel to control the machine operation. Also preferably, the mold station operating parameter, such as the mold station cavity air pressure, is sensed by sensing means mounted on the wheel for rotation with the wheel. The control means preferably includes a machine operator console and a second programmable logic means.

The advantages accruing to the blow molding machine and method of the present invention are numerous. For example, a plastic blow molding machine having a plurality of mold stations can be electronically controlled, resulting in a blow molding machine having a greater output with less maintenance-related downtime.

The above object and other objects and features of the invention will be readily appreciated by one of ordinary skill in the art from the following detailed description of the best mode for carrying out the invention when taken in connection with the following drawings.

BEST MODE FOR CARRYING OUT THE INVENTION

Figure 1:
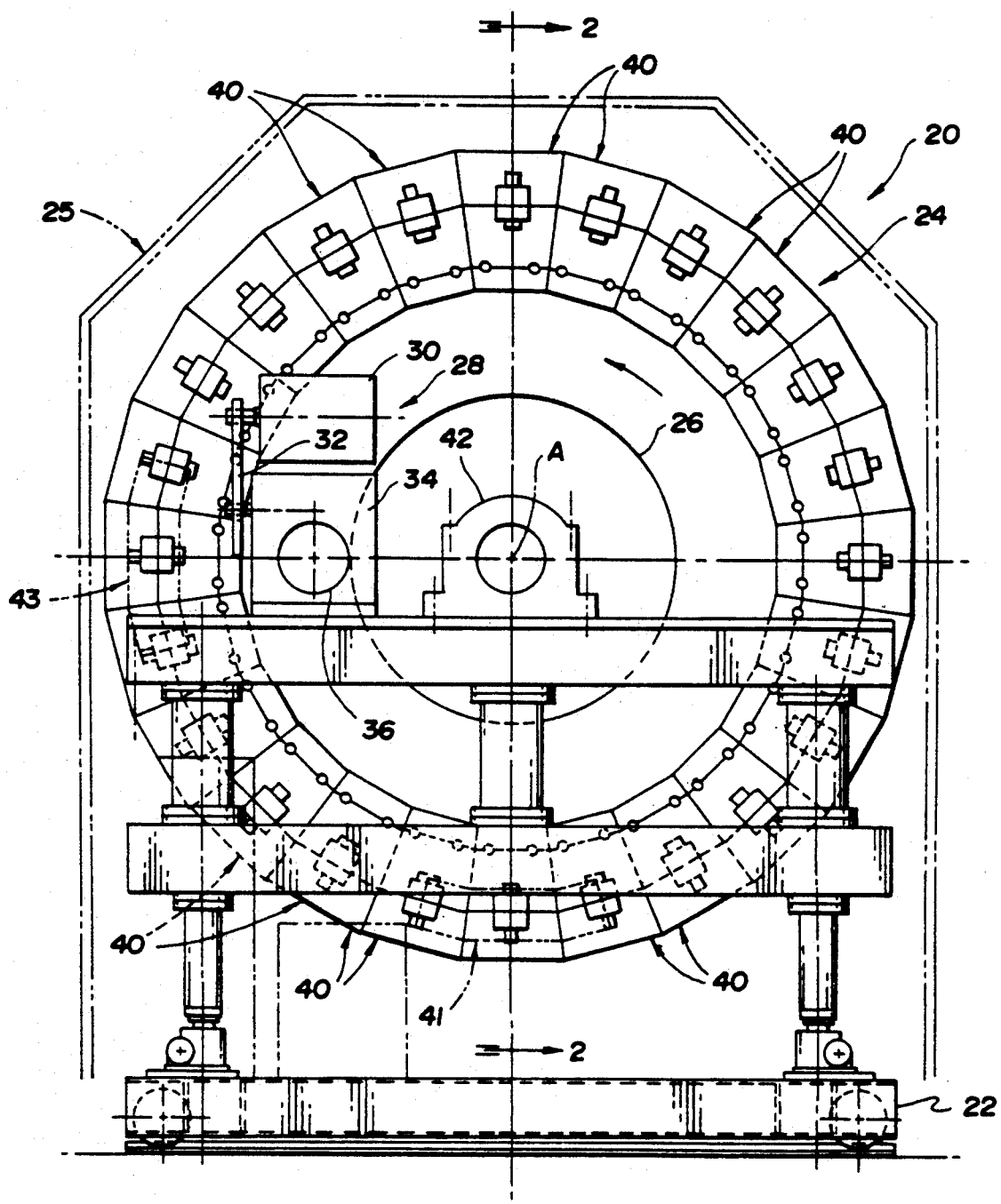
FIG. 1 is a side elevational view of a plastic blow molding machine that is of the wheel type and is constructed in accordance with the present invention to include a wheel mounted computer for controlling a plurality of mold stations.
Figure 2:
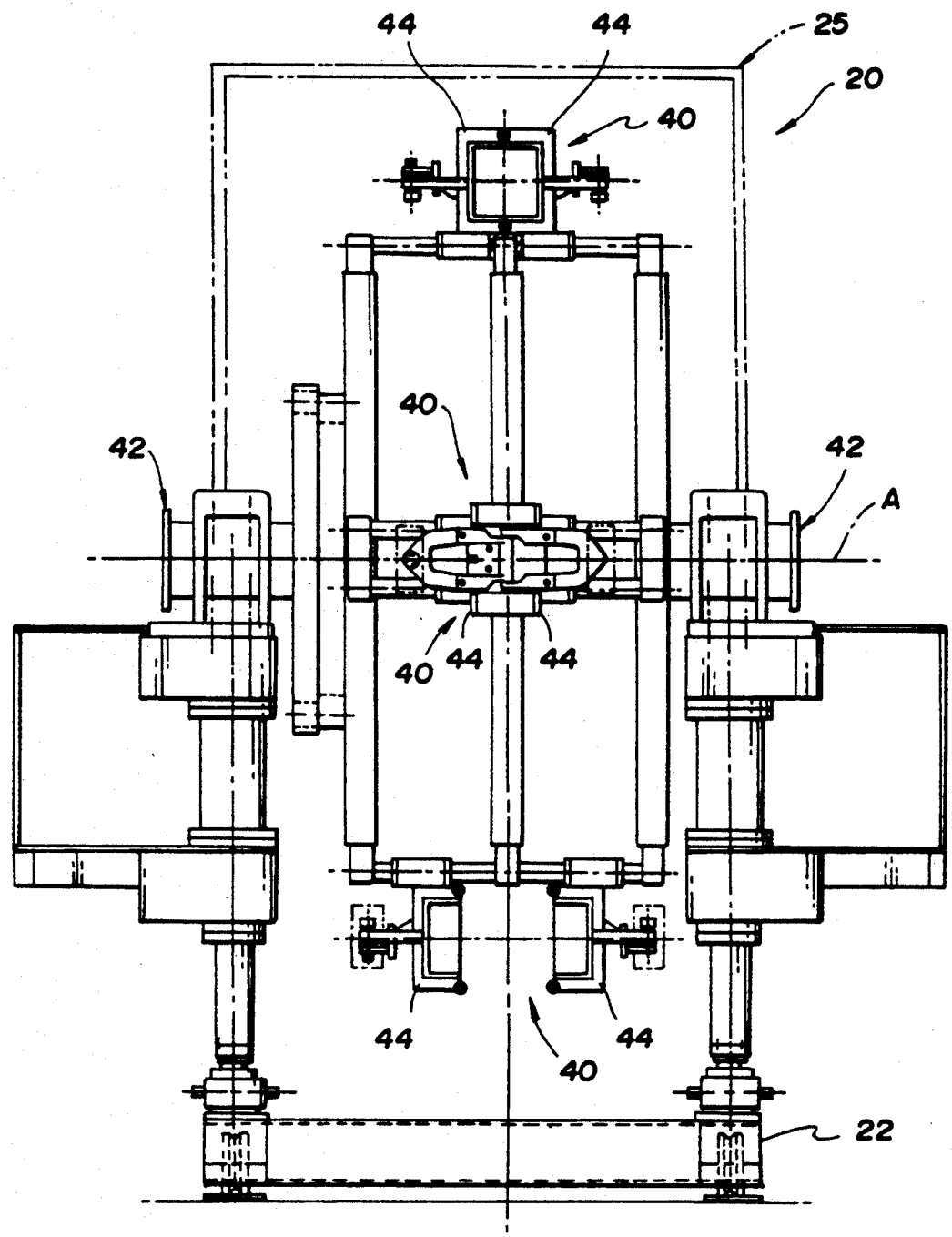
FIG. 2 is an elevational view taken generally the direction of line 2—2 in FIG. 1, but only showing three mold stations to illustrate the opening and closing of the mold stations.

Referring now to FIG. 1 and FIG. 2, there is illustrated a plastic blow molding machine shown generally by reference numeral 20. The blow molding machine 20 includes a base 22 and a wheel 24 mounted on the base for rotation thereon about a rotational axis A within a housing 25 shown by phantom line representation. As illustrated, the blow molding machine includes a drive gear 26 driven by a drive mechanism 28. The drive mechanism 28 includes an electric drive motor 30 for driving a gear reducer 34 through drive coupling 32. The output gear 36 of gear reducer 34 meshes with the drive gear 26 to rotate the wheel 24.

As best shown in FIG. 1, the plastic blow molding machine 20 includes a plurality of blow molding stations 40 mounted on the wheel 24 for rotation therewith about the rotational axis A. As shown, the wheel 24 preferably has twenty-four mold stations 40, identified by S1–S24, which is a relatively large number of mold stations compared to conventional blow molding machines, so as to provide a relatively large output during machine operation. As is hereinafter more fully described, the mold stations 40 are cammed open at an opening station 41 and are cammed closed at a closing station 43.

As best shown in FIG. 2, each mold station 40 preferably includes a pair of mold halves 44 which open and close in a direction generally parallel to the rotational axis A during machine operation, as described in greater detail herein below. When the mold halves 44 are closed, a mold cavity is defined in which blow molding takes place. Operation of the blow molding machine 20, including operation of the mold stations 40, is controlled by a control system 70 shown in FIG. 3.

Figure 3:
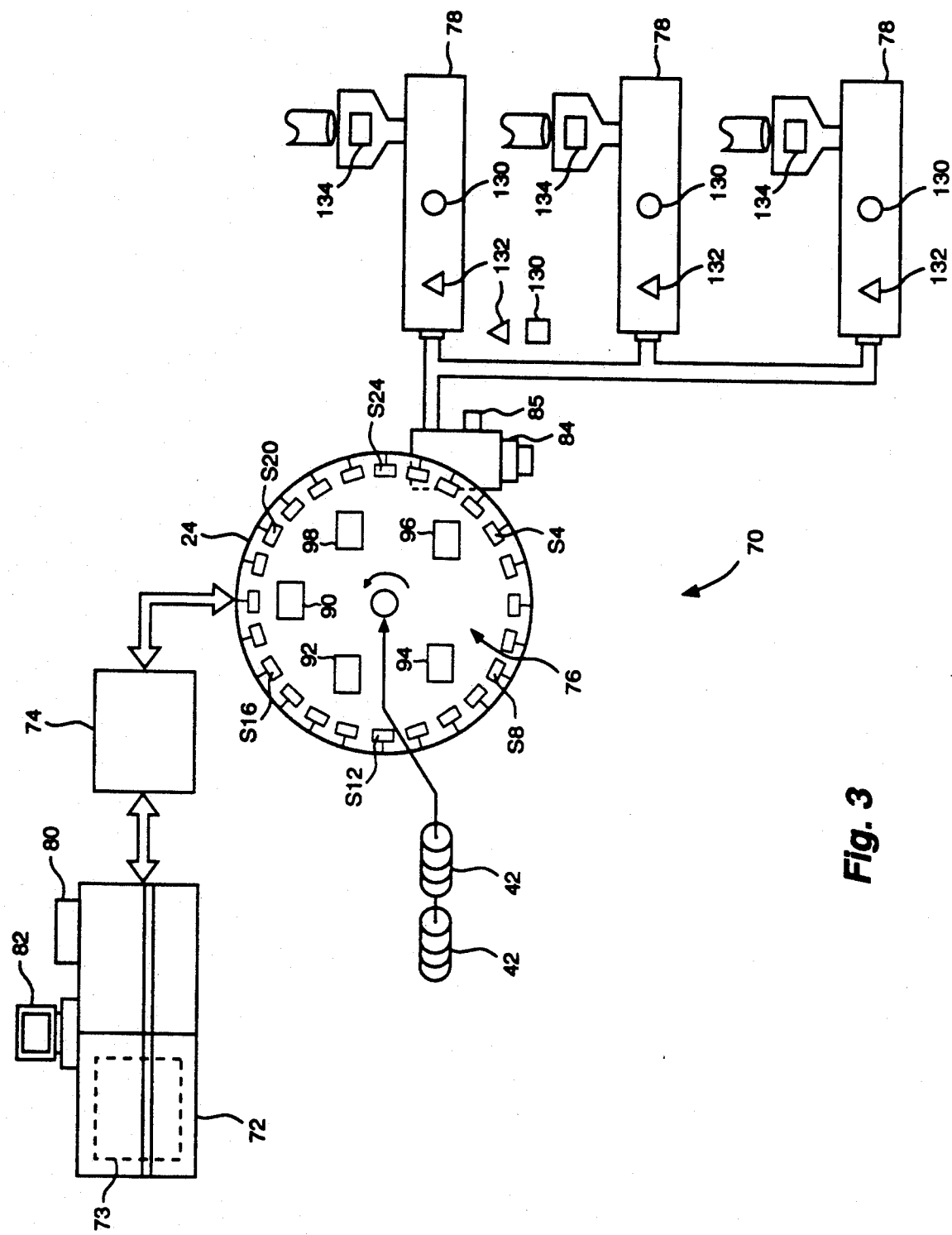
FIG. 3 is an environmental view of a control system for controlling the plastic blow molding machine shown in FIG. 1 and FIG. 2.

Turning now to FIG. 3, there is shown an environmental view of the control system 70 for controlling the plastic blow molding machine 20 based on wheel and mold station operating parameters. In the preferred embodiment, the control system 70 includes an operator console 72 and a main programmable logic controller (PLC) 74 which are located on the base side of the machine, and a distributed on-wheel control system 76. The operator console 72 preferably includes a process computer 73 housed therewithin (shown by phantom representation) which executes a control program, a printer 80 and a display 82. The operator console 72 also includes a plurality of "hard buttons", or switches (not specifically illustrated), through which an operator interface with the main PLC 74 and the distributed on-wheel control system 76 is enabled. The monitor 82, which preferably displays menus to the machine operator, includes a plurality of "soft buttons" on the screen through which an operator makes menu selections, inputting data to the control system 70 so as to control operation of the machine 20, as described below.

With continuing reference to FIG. 3, the control system 70 also preferably controls a plurality of DC drives (not specifically illustrated) for the wheel 24 and the extruders 78, a parison program pump valve 84 including a parison servovalve 85 and temperature controls, such as heaters 130 and thermocouples 132, for the heating and cooling of the extruders 78 and downstream zones between the extruders and the wheel 24.

Figure 4:
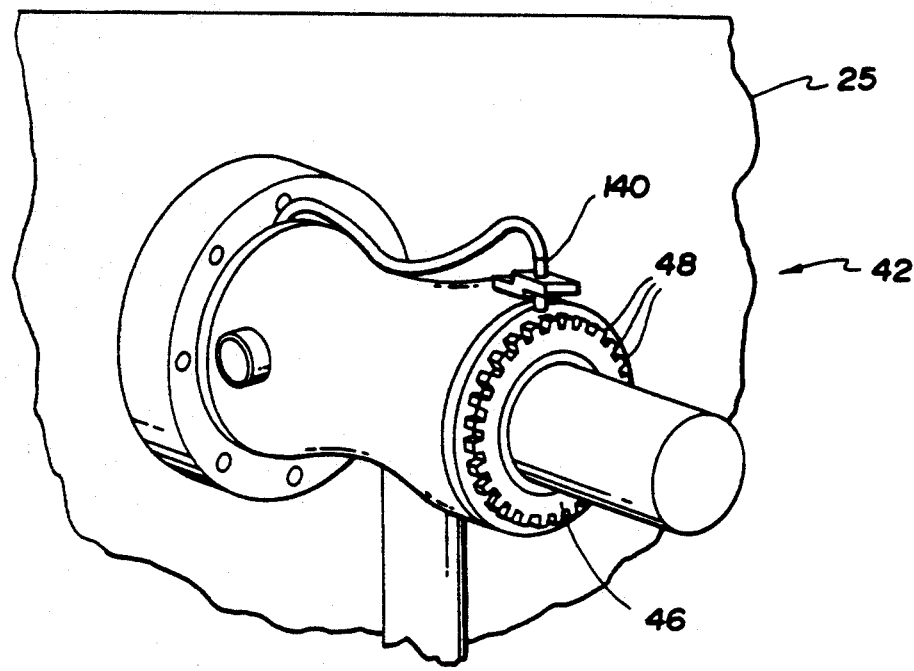
FIG. 4 is a perspective view of a rotary coupling for use with the plastic blow molding machine shown in FIG. 1 and FIG. 2.

With combined reference to FIGS. 3 and 4, the blow molding machine 20 includes a rotary coupling 42 located on each side of the wheel 24. The rotary coupling 42 preferably functions as a rotary coupling through which passes the electrical wiring, fluid and air supply extending from the rotating mold stations and the associated input/output (I/O) and actuating devices to the control system, which is located substantially on the base side of the machine 20. Most preferably, hydraulic plumbing for the cooling water and low voltage electrical wiring for communications between the mold stations and the control system 70 are located in one rotary coupling 42, and high voltage wiring for operating wheel components is located in the other rotary coupling 42. This arrangement insures the communication wiring will not be affected by electrical noise from the high voltage wiring.

Each mold station 40 preferably includes a plurality of associated I/O and actuating devices. The I/O devices provide sensory information to the control system 70 which includes a wheel-mounted programmable logic controler (PLC) 100, which is shown in FIG. 9 and described in greater detail below. The actuating devices function to control the operation of the machine 20 in response to the sensory information. Each mold station 40 preferably includes a lock pin switch 50 (shown in FIG. 5a, 5b), a mold position switch 52 (shown in FIG. 6) which includes a switch mechanism 52a and a stationary operator 52b, a bottle eject solenoid actuated valve 54 (shown in FIG. 7), a flapper valve 56 (shown in FIG. 8), a solenoid actuated needle valve 58 (shown in FIG. 8), high and low pressure air solenoid actuated valves 60 and 61 (shown in FIG. 8) and an air blow pressure transducer 62 (also shown in FIG. 8).

Figure 5A:
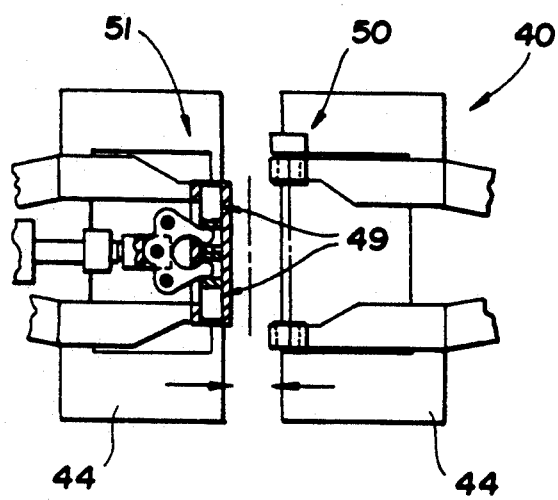
FIG. 5a is an elevational view of the partially open mold halves of a mold station shown in FIG. 1.
Figure 5B:
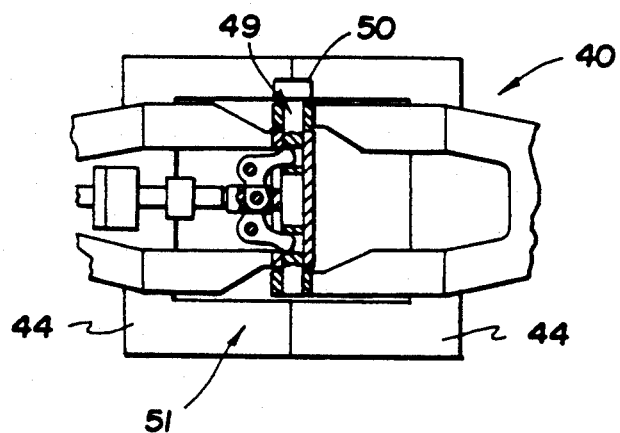
FIG. 5b is an elevational view of the mold station shown in FIG. 5a in the closed position with the lock pin switch actuated.

Referring now to FIGS. 5a and 5b, there is shown a time sequence of a mold station 40 as it closes, triggering the lock pin 50 switch which is affixed to a lock mechanism 51 of a mold station 40. The lock pin switch 50 is a preferably a proximity switch. As the mold halves 44 move toward each other in the direction of the arrows shown in FIG. 5a to a closed position shown in FIG. 5b, the lock mechanism 51 engages and the lock pins 49 extend therethrough and the switch 50 senses the extended pins. The lock pin switch 50 can therefore function as a safety feature, allowing the control system 70 to monitor the position of the mold halves 44 and control the blowing operation accordingly. Preferably, the lock pin switch output signal is at a "high" level when the mold halves are closed and the blowing operation is allowed to proceed.

Figure 6:
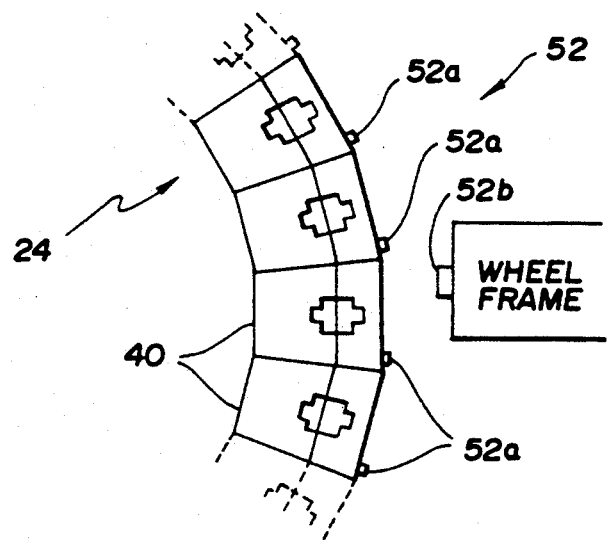
FIG. 6 is a partial view of the blow molding wheel and frame illustrating the mounting of a mold position proximity switch mechanism on the wheel and the switch operator on the frame.

As best shown in FIG. 6, the mold position switch 52 is a proximity switch having a switch mechanism 52a and a stationary operator 52b which cooperate to allow the control system to monitor the position of each mold station 40 as the wheel 24 rotates during machine operation. Preferably, a mold position switch mechanism 52a is affixed to each mold station 40 and an operator 52b is affixed to a member of the wheel frame so that the switch mechanism is actuated as each mold station 40 rotates past the 3:00 o'clock position, viewing the wheel 24 as shown in FIG. 3.

Figure 7:
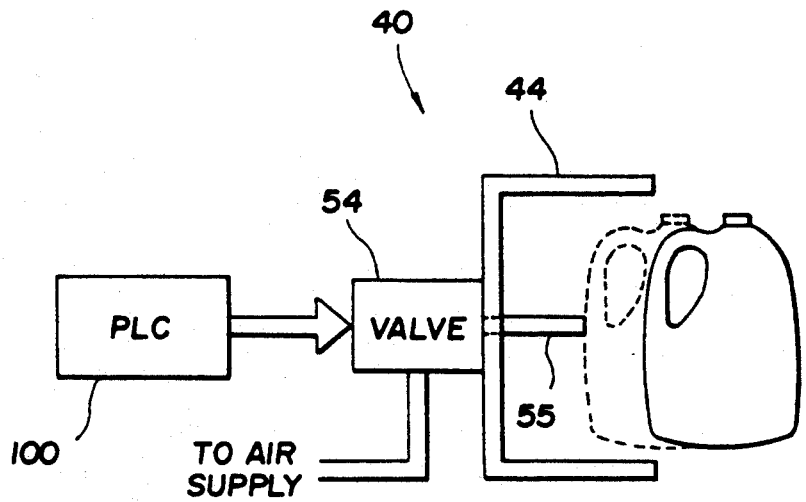
FIG. 7 is a block diagram illustrating energizing of a bottle eject solenoid to eject the blow molded article from the mold of the associated mold station.

Referring now to FIG. 7, the bottle eject solenoid actuated valve 54 is an actuator for ejecting the blow molded article, such as a bottle, from the mold station 40 during the Eject Cycle of the Parison Mold Sequence Cycle (shown in FIG. 13 and described in greater detail below). After the blowing operation is complete, the PLC 100 energizes the solenoid actuated valve 54, which allows pressurized air to be diverted to a bottle eject cylinder 55. The cylinder 55 then extends, ejecting the blow molded bottle from the mold.

Figure 8:
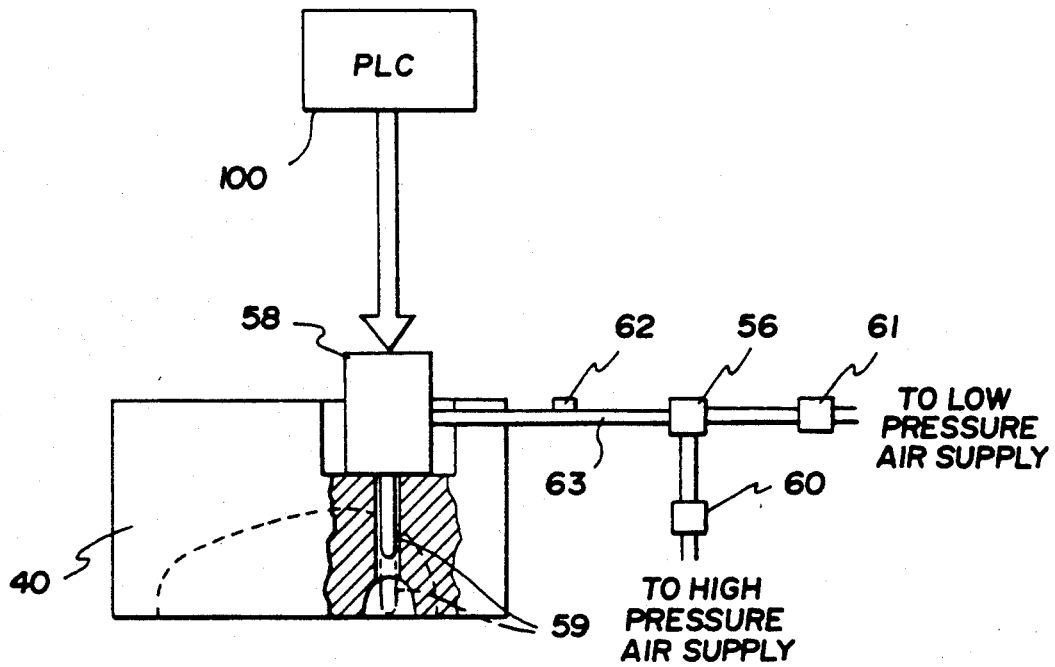
FIG. 8 is a block diagram illustrating the energizing of a needle solenoid to extend a blow needle into the hot parison prior to the blowing operation.
Figure 9:
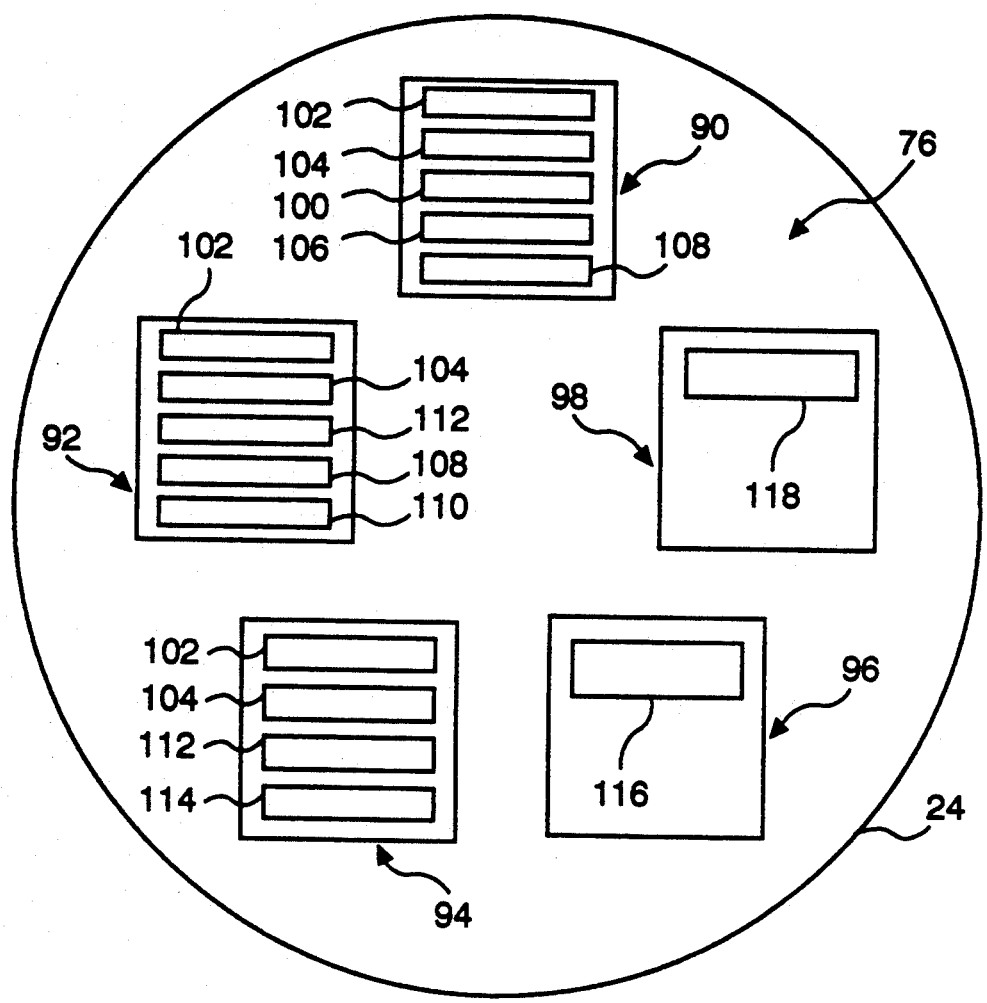
FIG. 9 is an enlarged diagram of the machine wheel but shown without the individual mold stations to illustrate the control enclosures mounted on the wheel and the control hardware mounted within the enclosures, in accordance with the present invention.

As best shown in FIG. 8, the needle solenoid valve 58 operates as an actuator for insertion of a blow needle 59 into the hot parison plastic prior to the actual blowing operation. The solenoid valve 58 is energized by a control signal from the on-wheel PLC 100 and the needle 59 extends into the parison, as shown in phantom. The low pressure air and high pressure air are delivered to the solenoid valve 58 for providing different air pressures through the needle 59 into the parison at various stages of the blow cycle. Preferably, a flapper valve 56 is in fluid communication with a high pressure solenoid actuated valve 60 and a low pressure solenoid actuated valve 61. The valves 60 and 61 are preferably connected to pressurized air supplies communicated to the wheel through the rotary coupling previously described. First, low pressure air (i.e. approximately 30 psi) is supplied through the low pressure solenoid valve 61 and flapper valve 56 to insure the hot parison will keep its shape prior to the blowing operation. Subsequently, high pressure air (i.e. approximately 80 psi) is supplied through the high pressure solenoid valve 60 and flapper valve 56. The flapper valve 56 includes an internal "flap" which shuts off the supply of low pressure air as the high pressure air is being supplied to the needle 59. The high pressure air passes through the needle 59 and expands the parison to the shape of the mold cavity, as described in greater detail below.

With continuing reference to FIG. 8, the air blow pressure transducer 62 is shown connected to the air supply line 63 between the flapper valve 56 and the mold station 40. The air blow pressure transducer 62 is in fluid communication with the air supply line 63 and provides an analog signal, the magnitude of which is a function of the air pressure inside the parison being blown within the mold cavity when the mold is closed, to the control system. The control system can therefore monitor the air pressure in the mold cavity during the blowing operation for process control purposes, as is hereinafter described.

Referring once again to FIG. 3, in the preferred embodiment, the main PLC 74 is commercially available as Model No. 545 from Texas Instruments Incorporated of Dallas, Tex., United States of America, and communicates with the process computer of the operator console 72 and the control system 76. The main PLC 74 preferably monitors a plurality of parameters associated with operation of the machine 20, such as the mold clamp pressure, locking pin pressure, cooling water temperature, air supply pressure and wheel speed. A plurality of transducers (not specifically illustrated) are utilized to sense these parameters and generate analog output signals which are "conditioned" to a corresponding 0–10 VDC signal prior to being communicated to the main PLC 74. The PLC 74 is preferably coupled to the distributed on-wheel control system 76 via electrical wiring through the rotary coupling 42, as previously described.

Figure 10:
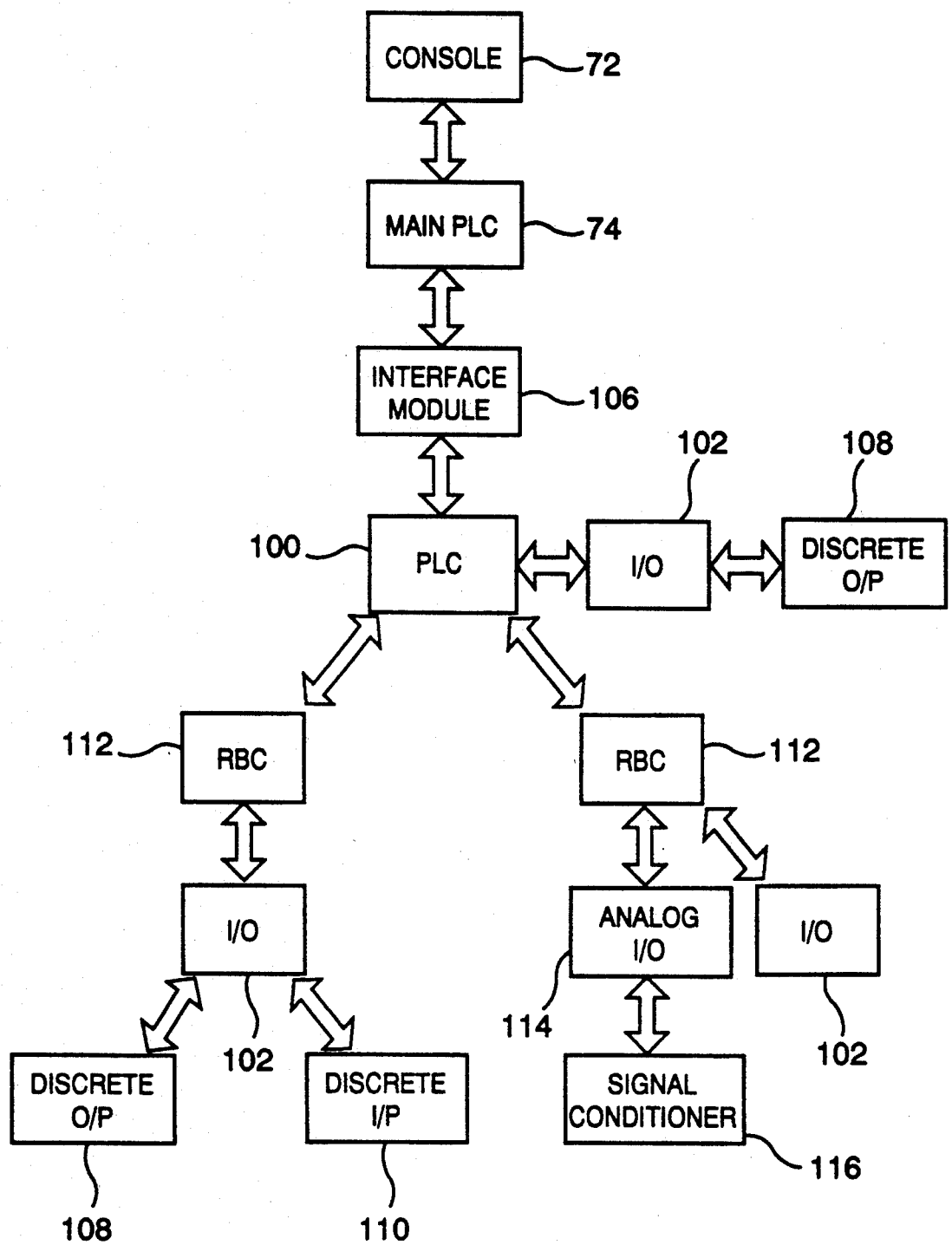
FIG. 10 is a block diagram of the control system of FIG. 3 illustrating the flow of input/output (I/O) data and control data.

As best shown in FIG. 3 and FIG. 9, the distributed on-wheel control system 76 includes a plurality of control enclosures 90, 92, 94, 96 and 98, each of which contains control hardware for controlling operation of the machine in cooperation with the main PLC 74, as hereinafter discussed. FIG. 10, a block diagram of the wheel control system, illustrates the "flow" of I/O data, control data signals between the operator console 72, main PLC 74 and the distributed on-wheel control system 76.

In the preferred embodiment, as shown in FIG. 9, the control enclosures 90, 92, 94, 96 and 98 are NEMA-12-type enclosures. The enclosures are fixedly attached to the wheel for rotation therewith. Generally, these enclosures provide easy access to components, a common ground potential and dust and dirt protection and also function as an electromagnetic shield.

With continuing reference to FIG. 9, control enclosure 90 preferably includes the PLC 100, an I/O module 102, a power supply 104, a serial interface module 106 and a discrete output module 108. The PLC 100 is commercially available as Model No. 545-1191 from Texas Instruments. The PLC 100 receives data from and controls the mold station I/O devices, monitors the mold cavity air pressure and monitor the lock pin switch for failure. The PLC 100, which is in communication with the main PLC 74 and the process computer of the operator console 72, accordingly controls operation of actuators, such as the bottle eject solenoid 54 shown in FIG. 7, and other aspects of the plastic blow molding machine, as described in greater detail herein below. The I/O modules are preferably grouped into local and remote categories, depending primarily on their location. The module 102 is considered a local I/O module, since it is located in the same enclosure as the PLC 100. The module 102 has four slots and allows a two-way exchange of data from the PLC 100 and the various mold station I/O devices. Preferably, the serial interface module 106 is commercially available as Model No. 505-7339 from Texas Instruments and functions to link the distributed on-wheel control system 76 with the main PLC and the operator console to effect control of the blow molding machine. Information and control data are exchanged between the on-wheel system 76 and the main PLC and the console through a serial communications port in the PLC 100. The discrete output module 108 is commercially available as Model No. 505-4732 from Texas Instruments and contains a plurality of output circuits and accepts DC voltages from the I/O module to be applied to various I/O devices, such as the bottle eject solenoid. The module 108 is preferably installed in any available slot of the I/O module 102. The power supply 104 is commercially available as Model No. 505-6660 from Texas Instruments and provides power to the other components in the enclosure 90. Preferably, the power supply 104 provides variable power at both +5 and −5 VDC for use by the PLC 100 and the I/O module 102.

As illustrated in FIG. 9, control enclosure 92, in the preferred embodiment, includes an I/O module 102, a power supply 104, a discrete output module 108, a discrete input module 110 and a remote base controller 112. As previously noted, the power supply 104 provides power to the hardware components in the enclosure 92. The discrete input module 110 is commercially available as Model No. 505-4332 from Texas Instruments and contains a plurality of input circuits and accepts DC voltage signals from various I/O devices, such as the lock pin switch 50. The module 110 is preferably installed in any available slot of the associated I/O module 102. The remote base controller (RBC) 112 is commercially available as Model No. 505-6851 from Texas Instruments and functions as a communication link between the PLC 100 of enclosure 90 and the control hardware of enclosure 92. Specifically, the I/O modules 102 in enclosures 92 and 94 communicate with the PLC 100 in the enclosure 90 through the RBC 112. The RBC 112 transmits all information from the I/O modules 102 directly to an I/O port of the PLC 100. Preferably, each RBC 112 utilizes a shielded twisted pair and functions best if placed within 3300 feet from the PLC 100.

Control enclosure 94, as shown in FIG. 9, preferably includes an I/O module 102, a power supply 104, an analog I/O module 114 and an RBC 112. The analog I/O module is preferably an 8-input, 4-output module which is commercially available as Model No. 505-7012 from Texas Instruments and is preferably installed in any available slot of the I/O module 102 in enclosure 94. The module 114 thus functions as an analog interface between on-wheel I/O devices, such as the air blow pressure transducer, and the PLC 100.

With continuing reference to FIG. 9, control enclosure 96 preferably includes a plurality of signal isolators/conditioners 116, such as the Model No. 4051/4251, commercially available from Action Instruments, Inc., of San Diego, Calif., United States of America. The conditioners 116 provide the necessary bridge excitation to the air blow pressure transducers and condition the analog outputs of the transducers into corresponding 0-10 VDC signals. These DC signals are then communicated to the analog I/O module 114 by wiring not specifically illustrated. Preferably, the transducers provide a gradient signal of the air pressure profile in each mold to the PLC 100. A pressure profile associated with a bottle of acceptable quality can be used as baseline for comparison to subsequent pressure profiles. For process control purposes, the profiles could be used to detect blow molded bottles having structural weaknesses or the like that would be undetected by mere visual inspection. Preferably, both the baseline and pressure profiles measured during blow molding may be displayed on the monitor. Of course, the operator may obtain a hard copy of the profiles utilizing the printer.

As shown in FIG. 9, control enclosure 98 preferably includes a single twenty-four VDC power supply 118 which supplies power to all on-wheel I/O devices, such as the lock pin switch and the like. Preferably, twenty-four wire or conductor cabling is utilized to provide electrical connections between the enclosures. The PLC 100, as a part of the on-wheel control system 76, thus functions as a distributor for the main PLC and the operator console. By locating the PLC 100 on the wheel 24 (i.e. in the control enclosure 90), electrical wiring and the like extending from the off-wheel main PLC and operator console through the rotary couplings and to the mold stations and their associated I/O devices, is minimized. Thus, a blow molding machine having a large number of mold stations 40 is possible. A similar sized machine, controlled entirely by off-wheel stationary controllers, is not feasible, due to the problems of providing the wiring to the rotating wheel.

Figure 11:
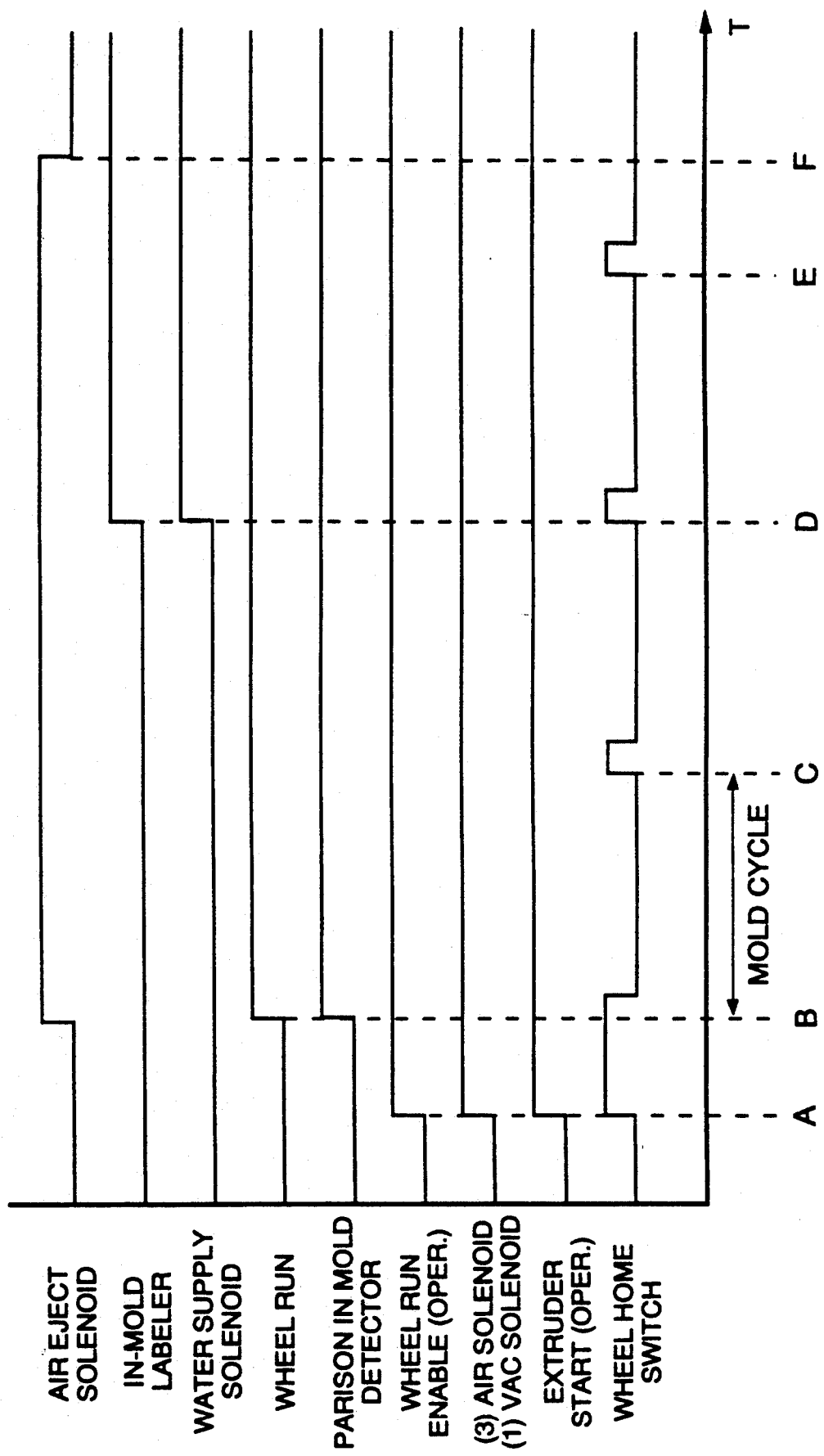
FIG. 11 is a timing diagram illustrating the first four wheel rotations for the plastic blow molding machine of the present invention.

Referring now to FIG. 11, there is shown a timing diagram illustrating the first four (4) wheel cycles for the plastic blow molding machine 20. A control program executes in the process computer of the operator console to control operation of the blow molding machine, as described in greater detail herein below. The blow molding machine operates in either the RUN, or blow-mold, mode or the JOG mode. The JOG mode is entered when the operator depresses one of the jog buttons on the operator console 72 shown in FIG. 3. When the machine is in the JOG mode, only the bottle eject solenoids are operational. Preferably, there are wheel and extruder "jog forward" buttons and a wheel jog reverse button. The JOG speed reference levels are adjustable in the respective wheel and extruder drives. The JOG mode on any drive is disabled when that drive is operating in the RUN mode.

Figure 12:
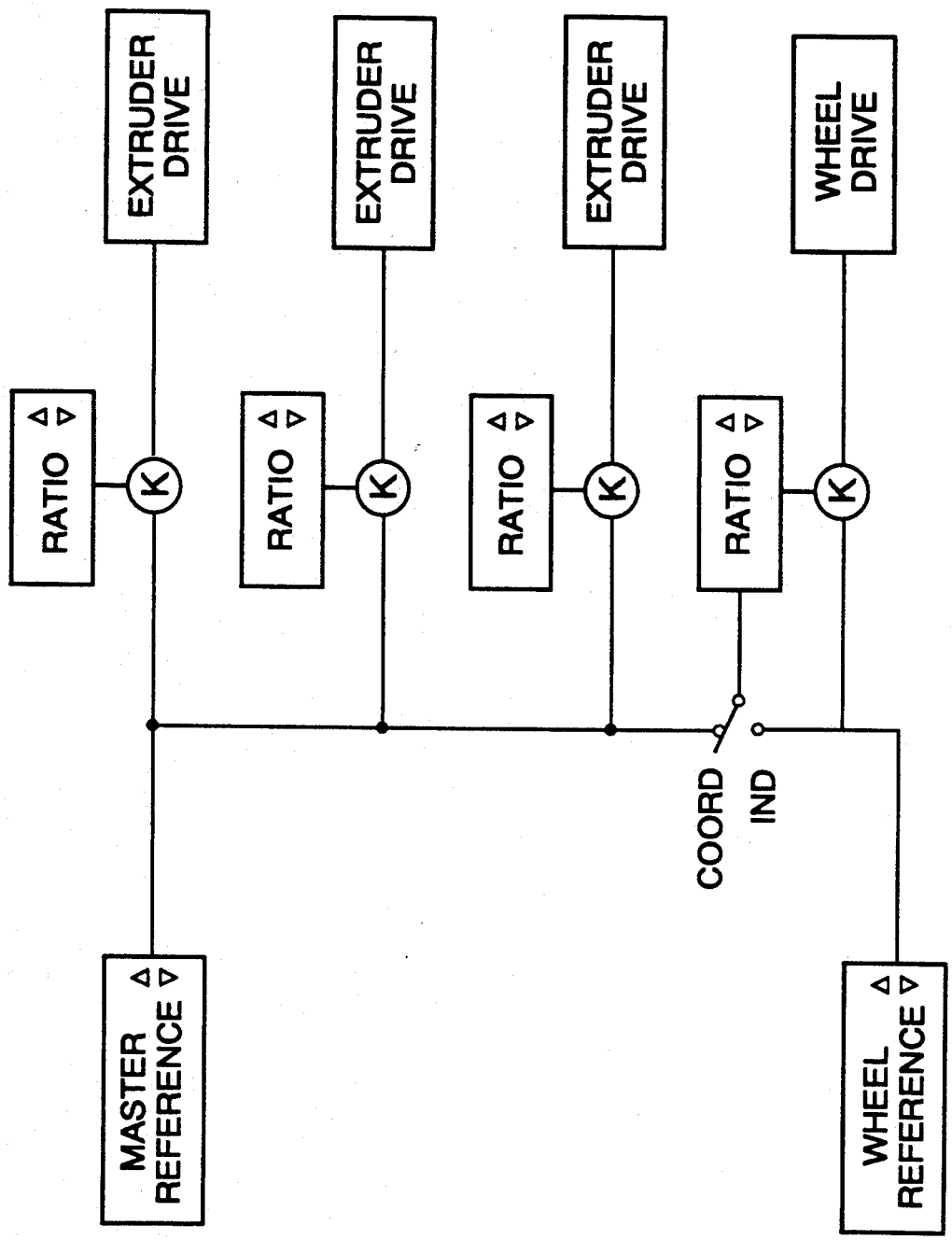
FIG. 12 is a block diagram of the coordinated drive speed control for use with the plastic blow molding machine of the present invention.

Referring now to FIG. 12, there is shown a block diagram of the Coordinated Drive Speed Control, for use in the RUN mode, implemented by the control system. As illustrated, all four drives (i.e. three extruder drives and a wheel drive) are controlled simultaneously by a master reference signal from the main PLC. The master reference signal provides a common 0-10 VDC signal to the drives and has a value that varies from 0%-100%. Thus, the speed of all of the drives change simultaneously. The speed relationship between the extruder and wheel drives are also controlled by the operator utilizing four individual ratio settings. The ratio settings can be set from 0%-100% again, represented as "K", and thus allows the operator to further adjust the master reference signal to each drive.

As shown in FIG. 12, the wheel drive is provided with the additional capability of being controlled independently of the extruder drives. This independent drive control is implemented by the control system utilizing COORD/IND function soft-button on the display and a separately adjustable wheel reference signal. The master reference, wheel reference and ratio values are modifiable by the user through "soft keys" on the display, as indicated by the up/down arrows in FIG. 12. In the preferred embodiment, all drive control operator functions, with the exception of JOG functions, are implemented utilizing "soft-buttons" on the display shown in FIG. 3. The JOG functions, as previously described, are implemented in hard-wired buttons on the operator console. The drive control operator functions include wheel and extruder ENABLE/DISABLE functions, a START function to start all enabled extruder and wheel drives, a STOP function and the COORD/IND function. The operator functions also preferably include RAISE/LOWER functions for the master reference, drive ratio and wheel reference setpoints and associated percent maximum setpoint (0%-100%) numerical displays.

Sequence of Operation

Referring to FIGS. 3 and 11, the control program preferably performs system checks on a plurality of extruder and wheel "initial conditions" to insure these conditions are satisfied before the blow molding machine 20 begins operation at time T=A. For example, the main PLC 74 purges the extruders 78 of any plastic material from the prior machine operation, energizes heaters 130 associated with the extruders to heat the extruders to the proper operating temperature and then stops the extruders 78. Thermocouples 132 associated with the extruders 78 provide temperature feedback to the main PLC 74. The extruder material feed bins should have enough resin to actuate the resin supply switches 134.

Additionally, the air eject solenoid and the air, vacuum and water supply solenoids, described in greater detail below, are preferably initially unpowered. The parison program pump valve 84, an assembly remote from the wheel 24 including a pump and motor and a reservoir for the resin, is preferably powered. The parison program pump valve 84 permits the operator to perform "parison programming". Parison programming is increasing and/or decreasing the wall thickness of the extruded parison to provide varying amounts of plastic to the mold. The parison-in-mold (PIM) switch 137, discussed in greater detail below, should be "off" (i.e. no parison sensed). Also preferably, the soak timer, which allows the temperature in the extruders 78 to equalize prior to blow molding, should be "timed out" (i.e. the temperatures equalized) and the in-mold labeler, utilized to place labels in a mold prior to the blowing operation, should be "off". The wheel drives should be stopped and the safety doors of the blow molding machine should be closed. Still further, the control program verifies that no emergency stop (E-STOP) conditions exist prior to machine operation. In the preferred embodiment, the E-STOP condition is monitored by the main PLC 74. An emergency stop sequence will be initiated based on a plurality of conditions, such as the operator safety doors being opened during machine operation, a bottle being detected in the mold after the end of a wheel cycle, or the in-mold labeler and cam safety switches being actuated. Additional conditions that result in an E-STOP sequence being initiated include extruder shutdown, control program shutdown or loss of air or water supply pressure to the machine.

In the preferred embodiment, initiation of an E-STOP sequence results in the wheel and extruder drives being stopped immediately and all solenoids, except for the needle solenoids, being de-energized. If the machine is in the RUN (i.e. blow mold) mode, the needle solenoids are preferably de-energized after a two (2) second delay, which allows for exhaust. If the machine is in the JOG mode, only the bottle knockout air cylinders remain operational. To resume operation of the machine, the E-STOP reset hard button located on the operator console 72 must be depressed after the condition triggering the emergency stop has been acknowledged and cleared.

With continued reference to FIGS. 3 and 11, if the initial conditions are satisfied and no E-STOP conditions exist, the blow molding machine 20 may be operated. To begin operation, the operator utilizes the jog buttons on the operator console 72 to jog, or rotate, the wheel 24 until the "S24" mold station is proximate to the wheel home position (i.e. about the 3:00 o'clock position), as best shown in FIG. 3. As illustrated, the wheel rotation is preferably in the counterclockwise direction. When the mold station S24 is in the home position, the S1 mold station is proximate to the parison program pump valve 84 and the wheel home switch (not specifically illustrated) is actuated at time T=A, signified by the step-up in the wheel home switch timeline. For clarity, the following discussion of the blow molding operation refers only to the S1 mold station. In the preferred embodiment, the wheel home switch is a photodetector. Like the mold position proximity switch 52, the wheel home switch includes a switch mechanism and an operator, such as a reflector, mounted on the S24 mold station. The switch mechanism is mounted on the wheel frame so that when the S24 mold station rotates past the 3:00 o'clock position, as shown in FIG. 3, the switch mechanism is actuated and an electrical signal is generated. Thus, when the wheel home switch is triggered, the wheel is in a "home" position and the S1 mold station is in the proper position to receive a hot parison for the start of a Blow Cycle at time T=B.

As illustrated in FIG. 11, prior to the first wheel rotation beginning at time T=B, the operator preferably selects the Wheel Run Enable and Extruder Start "soft buttons" on the display. Once the wheel is enabled, the blow molding machine enters the RUN mode and the process computer energizes the air and vacuum supply solenoid valves, which are located external to the wheel, such as mounted on the base. The supply solenoid valves include the bottle eject cylinder air supply, the low pressure air supply, the high pressure air supply and the vacuum supply, and provide high and low air pressures and vacuum assist to each of the mold stations via fluid plumbing extending through the rotary couplings 42. As illustrated, these solenoid valves remain energized during all subsequent wheel rotations.

As shown in FIG. 11, at time T=B the wheel drives are energized, as indicated by the step-up in the Wheel Run timeline. At that time, the parison rises from the flowhead into position between the opened mold halves of mold S1 and is detected by the parison-in-mold (PIM) photodetector. The PIM detector, substantially similar to the wheel home switch photodetector previously described, includes a stationary switch mechanism photodetector. Unlike the wheel home switch, however, which had a single reflector mounted on mold station S24, the PIM photodetector has a reflector mounted on each mold station. Since blow molding machine utilizes a continuous extrusion process, the PIM photodetector timeline remains "high" (i.e. parison detected) throughout subsequent wheel rotations. As wheel rotation continues, the wheel home switch is released when the mold station S24 leaves the home position, as indicated by the step-down in the wheel home switch timeline.

With continuing reference to FIG. 11, in the preferred embodiment, an air eject solenoid (itself not specifically illustrated) is also energized at time T=B. The air eject solenoid is located physically downstream from the blow molding machine mounted on an exit conveyor and, when energized, diverts low quality blow molded bottles off of the conveyor to a "scrap" area. After the blow molding machine is started, blow molded bottles are produced during the first wheel rotation. The bottles produced during the first wheel rotation begin being ejected from the machine 20 at the start of the second wheel rotation. Similarly, the bottles produced during the second wheel rotation begin being ejected at the start of the third wheel rotation. Typically, the quality of the bottles produced during the first two wheel rotations is unacceptable. The in-mold labeler, therefore, is not activated until the start of the third wheel rotation. At the start of the third rotation, the bottles from the first wheel rotation are just arriving at the scrap bottle diverting area downstream. Therefore, at the start of the fourth wheel rotation, the bottles from the second wheel rotation are just arriving downstream. As illustrated in FIG. 11, the air eject solenoid must therefore be energized through the end of the fourth wheel rotation.

Figure 13:
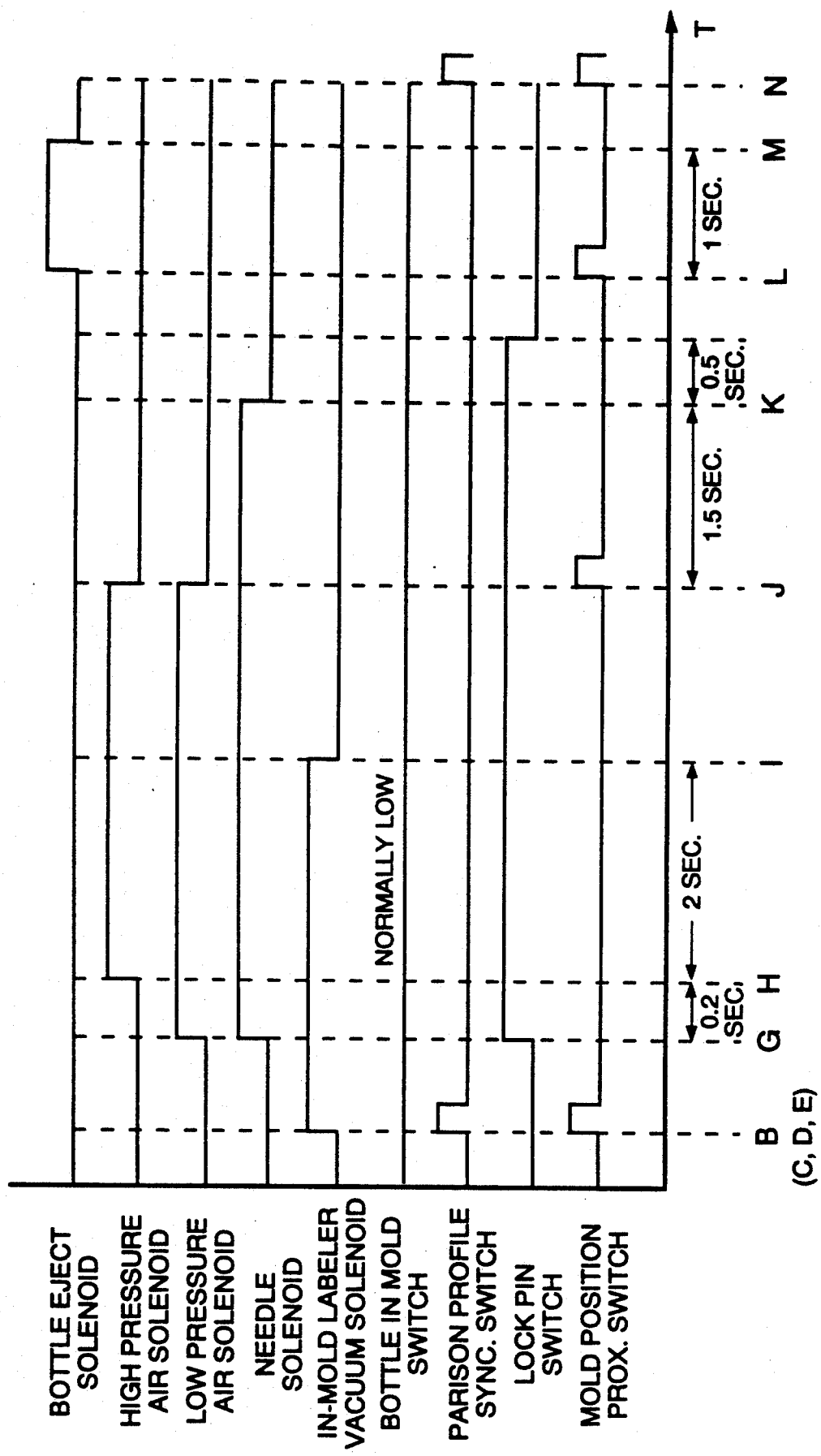
FIG. 13 is a timing diagram illustrating the parison mold sequence cycle that occurs during each wheel rotation.

Referring now to FIG. 13, there is shown the timing diagram for the Parison Mold Sequence Cycle, which occurs once during each of the wheel rotations shown in FIG. 11. Since the Parison Mold Sequence Cycle occurs during each rotation, the start of the cycle is actually corresponds to times T=B, C, D and E of FIG. 11. At the start of each Parison Mold Sequence Cycle, the mold position proximity switch for the S1 mold station and the parison profile synchronizing switch 140 (shown in FIG. 4 and described in greater detail below), are actuated, as indicated by the step-up in the associated timelines at time T=B. As previously described, each mold station preferably includes a mold position proximity switch. The Blow Cycle starts at time T=B when the mold closes and continues so long as the signal from the mold position proximity switch is present. Thus, the mold position proximity switch controls the blow sequence for each mold and serves as a flag to stop the Blow Cycle Start (at time T=B), the Exhaust Cycle Start (at time T=J) and the Eject Cycle Start (at time T=L). This sequence helps to insure the parison does not collapse or sag before the blowing operation occurs.

Figure 14:
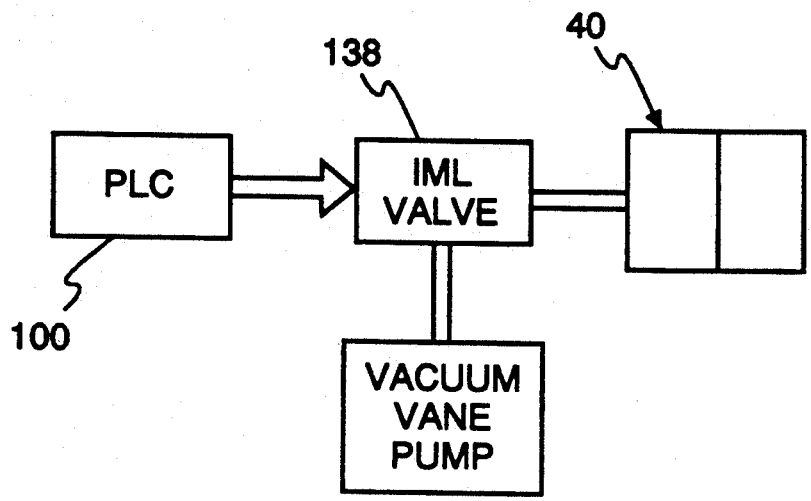
FIG. 14 is a block diagram illustrating the use of a PLC-controlled solenoid valve and vacuum vane pump to create a vacuum inside a mold cavity for in-mold labeling.

With additional reference to FIG. 14, the in-mold labeler vacuum solenoid valve 138 and the parison profile synchronizing switch 140 are also energized at time T=B. Additionally, the mold station and a vacuum vane pump or the like are in fluid communication through the vacuum solenoid valve 138. When the on-wheel PLC energizes the vacuum solenoid 138, a direct air flow path between the vacuum vane pump and the mold station is established. As the vane pump withdraws air from the mold cavity through a plurality of orifices in the mold face, a "vacuum" is created within the mold cavity so as to hold the label in place prior to and during part of the blowing operation.

Returning now to FIG. 4, the parison profile synchronizing switch 140 is preferably located off of the wheel proximate to the rotary coupling 42 and cooperates with a magnetized cog ring 46. The cog ring 46 is attached to the rotary coupling for rotation therewith and includes twenty-four (24) cogs 48 disposed thereabout for triggering the synchronizing switch 140 during wheel rotation. As the attachment 46 rotates, the switch 140 senses magnetic field variations caused by the rotating cogs 48. The twenty-four actuations of the switch 140 provide a parison program cycle time (i.e. the finite time interval between mold stations) to the parison program pump valve 84. This time interval, of course, varies based on wheel speed and extrusion rate.

With reference to FIGS. 3 and 13, at time T=G the mold halves of station S1 are closed about the parison and the lock pin switch 50 (previously described and shown in FIGS. 5a and 5b) is actuated thereby, as indicated by the step-up in the lock pin switch timeline. As illustrated, the lock pin switch 50 remains actuated until the mold is opened after the blowing operation. Once the mold is closed, the needle solenoid valve 58 (previously described and shown in FIG. 8) is energized and the needle is inserted into the parison in preparation for the blowing operation. Upon insertion of the needle into the parison, the low pressure air solenoid actuated valve 61 is energized and air at approximately 20-30 psi is injected through the needle into the parison so as to preserve the shape of the parison until the blowing operation. The duration of this low pressure air blast is preferably approximately 0.2 S.

With continued reference to FIG. 13, at time t=H during the Parison Mold Sequence Cycle, the high pressure air solenoid valve 60 is energized and the blowing operation is performed. Upon energization of the high pressure solenoid actuated valve 60, air at approximately 80-100 psi is injected through the needle into the parison, expanding the parison into conformance with the mold cavity. As illustrated in FIG. 13, the duration of this high pressure air blast preferably exceeds 2 S and functions to delay the deenergization of the in-mold labeler vacuum solenoid 138 shown in FIG. 14.

As illustrated in FIG. 13, after 2 S of the high pressure air, at time T=I the in-mold labeler vacuum solenoid 138 is de-energized, since the label is affixed to the blow-molded article. At time T=J, the Exhaust Cycle of the Parison Mold Sequence is initiated as the mold position proximity switch associated with mold station S1 is actuated. The switch operator for the Exhaust Cycle, such as a stationary flag, is preferably mounted to the wheel frame at about the 7:00 o'clock position. When the mold position switch 52 is actuated, the exhaust cycle is entered and the control system de-energizes the low pressure air solenoid actuated valve 61 and the high pressure air solenoid actuated valve 60. In the preferred embodiment, approximately 1.5 S later, at time T=K, the needle solenoid is de-energized and the needle is retracted. Approximately 0.5 S later, the mold halves of mold station S1 are opened and the lock pin switch is released, as indicated by the step-down in the lock pin switch timeline.

With continued reference to FIG. 13, at time T=L, the Eject Cycle of the Parison Mold Sequence Cycle is initiated as the mold position proximity switch associated with mold station S1 is actuated. The switch operator for the Eject Cycle, such as a stationary flag, is preferably mounted to the wheel frame at about the 5:00 o'clock position, viewing the wheel 24 as shown in FIG. 3. The bottle eject solenoid is preferably energized at time T=L and the associated mold station bottle eject cylinders (not specifically illustrated) extend so as to eject the blow-molded bottle from the mold. A bottle eject solenoid energization time of approximately 1 S should provide ample time in which to eject the bottle. After the 1 S delay, at time T=M, the control system senses the state of the bottle-in-mold (BIM) switch. Preferably, the BIM switch is a standard limit switch mounted on each mold station. The BIM switch is actuated by the presence of a blow molded article in the mold. If the BIM switch is actuated, an emergency stop sequence is initiated, as previously described. If the BIM switch is not actuated, the bottle was successfully ejected from the mold and the Parison Mold Sequence Cycle for the mold station S1 is complete.

Returning now to FIG. 11, the wheel enters the second, third and fourth wheel rotations at times T=C, T=D and T=E, respectively. As illustrated, these wheel rotations are initiated with the actuation of the wheel home switch as the mold station S24 returns to the home position, as previously described with reference to the first wheel rotation. With combined reference to FIG. 11 and FIG. 13, the second, third and fourth wheel rotations proceed substantially similarly to the first wheel rotation described above and the Parison Mold Sequence Cycle as previously described occurs during each wheel rotation. At the start of the third wheel rotation at time T=D, however, the in-mold labeler and the water supply solenoid are energized. The in-mold labeler as is known, provides one or more labels to the mold prior to the blowing operation, during which each label becomes affixed to the blow molded bottle. As previously described, the mold preferably includes a plurality of vents disposed therein which cooperate with the associated in-mold labeler solenoid valve 138 to create a vacuum in the mold when the solenoid valve is energized, thereby holding each label in place until the blowing operation occurs.

Figure 15:
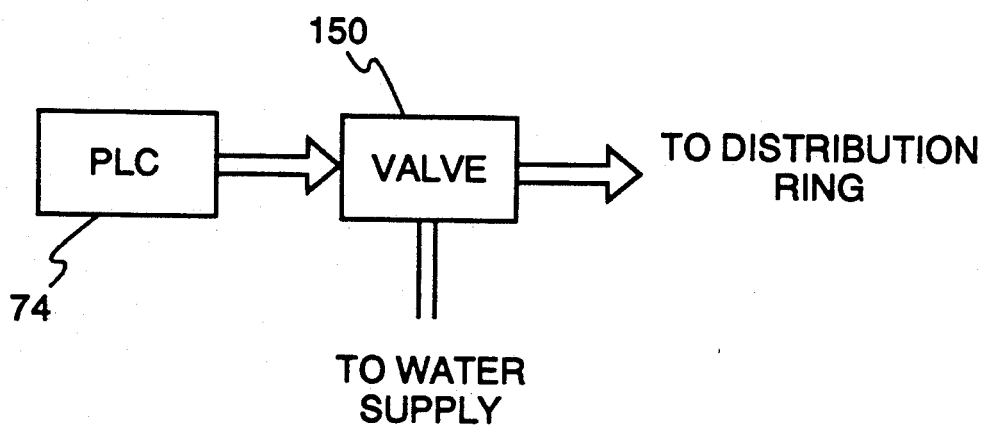
FIG. 15 is a block diagram illustrating the use of a PLC-controlled water supply solenoid valve and distribution ring to supply water to the plurality of mold station for cooling purposes.

Referring now to FIG. 15, in the preferred embodiment, the water supply solenoid 150 is a motorized ball valve located external to the wheel 24 connected to a pressurized water supply. When the main PLC 74 energizes the solenoid valve 150, water is supplied to a distribution ring for distribution to each of the mold stations 40 via hoses extending from the distribution ring to the mold stations 40. Typically, the wheel 24 can proceed through two (2) complete wheel rotations before the mold stations 40 require cooling, as indicated by the step-up in the water supply solenoid time-line at the beginning of the third wheel rotation (i.e. time T=D). Cooling of the molds continues for all subsequent wheel rotations.

As best shown in FIG. 11 and as previously described, the air eject solenoid is preferably deenergized at time T=F, the completion of the fourth wheel rotation. At that time, the bottles from the first two wheel rotations have all been diverted to "scrap". Bottles produced thereafter are labeled and of sufficiently high quality to start satisfying a presettable bottle count.

It is understood, of course, that while the form of the invention herein shown and described constitutes the preferred embodiment of the invention, it is not intended to illustrate all possible forms thereof. It will also be understood that the words used are words of description rather than limitation, and that various changes may be made without departing from the spirit and scope of the invention as disclosed.

What is claimed is:

1. A plastic blow molding machine comprising:
   a base;
   a wheel mounted for rotation on the base about a rotational axis and including a plurality of mold stations positioned on the wheel about the rotational axis, each mold station being movable between an open position to receive a hot plastic parison and a closed position where the parison is enclosed within mold station for blow molding; and
   programmable logic means mounted on the wheel for rotation therewith and coupled with the mold stations to control the machine operation.

2. The plastic blow molding machine of claim 1 further comprising at least one sensor for sensing a wheel operating parameter as the wheel rotates during operation of the machine.

3. The plastic blow molding machine of claim 1 further comprising sensing means mounted on the wheel for rotation therewith and coupled with the programmable logic means, to sense at least one operating parameter of each mold station upon rotation of the wheel on the base and to generate an associated operation signal, the programmable logic means processing the sensed operation signal and controlling the machine operation in response to the signal.

4. The plastic blow molding machine of claim 1 or 2 further comprising a rotary coupling between the base and the wheel, and control means located on the base side of the rotary coupling and being operable to provide at least one electrical control signal through the rotary coupling to the programmable logic means on the wheel to control the machine operation.

5. The plastic blow molding machine of claim 4 wherein the control means includes a machine operator console.

6. The plastic blow molding machine of claim 4 wherein the control means includes a second programmable logic means.

7. The plastic blow molding machine of claim 4 wherein the control means includes a machine operator console and a second programmable logic means.

8. The plastic blow molding machine of claim 4 further comprising actuating means controlled by the programmable logic means and the control means for operating the blow molding machine.

9. The plastic blow molding machine of claim 2 wherein the operating parameter is the cavity air pressure of the mold station.

10. The plastic blow molding machine of claim 3 wherein the sensing means comprises at least one transducer.

11. The plastic blow molding machine of claim 3 wherein the sensing means comprises at least one proximity switch.

12. A plastic blow molding machine comprising:
a base;
a wheel mounted for rotation on the base about a rotational axis and including a plurality of mold stations positioned on the wheel about the rotational axis, each mold station including a mold movable between an open position to receive a hot plastic parison and a closed position where the parison is enclosed within the mold for blow molding;
a rotary coupling between the base and the wheel;
programmable logic means mounted on the wheel for rotation therewith and coupled with the mold stations to control the machine operation; and
control means located on the base side of the rotary coupling and being operable to provide at least one electrical control signal through the rotary coupling to the programmable logic means on the wheel to control the machine operation.

13. A plastic blow molding machine comprising:
a base;
a wheel mounted for rotation on the base about a rotational axis and including a plurality of mold stations positioned on the wheel about the rotational axis, each mold station including a mold movable between an open position to receive a hot plastic parison and a closed position where the parison is enclosed within the mold for blow molding;
a rotary coupling between the base and the wheel;
sensing means mounted on the wheel for rotation therewith to sense at least one operating parameter of each mold station upon rotation of the wheel on the base and to generate an associated operation signal;
programmable logic means mounted on the wheel for rotation therewith and coupled with the sensing means to process the sensed operation signal and control the machine operation in response to the signal;
control means located on the base side of the rotary coupling and being operable to provide at least one electrical control signal through the rotary coupling to the programmable logic means on the wheel to control the machine operation; and
actuating means controlled by the programmable logic means and the control means for operating the blow molding machine.

14. A method for controlling a plastic blow molding machine including a base and a wheel mounted for rotation on the base about a rotational axis, the wheel including a plurality of mold stations positioned about the rotational axis, the method comprising:
rotating the wheel with a programmable logic means mounted thereon for rotation therewith;
generating at least one electrical operation signal based on an associated mold station operating parameter;
processing the electrical operation signal by the programmable logic means mounted on the wheel; and
controlling the machine operation by the programmable logic means in response to the processed electrical operation signal.

15. The method of claim 14 further wherein the wheel is rotated with a rotary coupling between the base and the wheel, and wherein a control means located on the base side of the rotary coupling is operated to provide an electrical control signal through the rotary coupling to the programmable logic means on the wheel to control the machine operation.

16. The method of claim 14 further wherein the mold station operating parameter is sensed by a sensing means mounted on the wheel for rotation with the wheel.

17. The method of claim 14 wherein the operating parameter sensed is the mold station cavity air pressure.

18. The method of claim 15 wherein the control means used includes a machine operator console.

19. The method of claim 15 wherein the control means used includes a second programmable logic means.

20. A method for controlling a plastic blow molding machine including a base and a wheel mounted for rotation on the base about a rotational axis, the wheel including a plurality of mold stations positioned about the rotational axis, the method comprising:
rotating the wheel with a rotary coupling between the base and the wheel, and with a programmable logic means mounted on the wheel for rotation therewith;
generating at least one electrical operation signal based on an associated mold station operating parameter;
processing the electrical operation signal by the programmable logic means mounted on the wheel; and
controlling the machine operation by the programmable logic means in response to the processed electrical operation signal.

21. A method for controlling a plastic blow molding machine including a base and a wheel mounted for rotation on the base about a rotational axis, the wheel including a plurality of mold stations positioned about the rotational axis, the method comprising:
rotating the wheel with a rotary coupling between the base and the wheel, and with a programmable logic means mounted on the wheel for rotation therewith;
generating at least one electrical operation signal based on an associated mold station operating parameter;
processing the electrical operation signal by the programmable logic means mounted on the wheel; and
controlling the machine operation by the programmable logic means mounted on the wheel and a control means located on the base side of the rotary coupling, which provides an electrical control signal through the rotary coupling to the programmable logic means on the wheel, to control the machine operation in response to the processed electrical operation signal.

* * * * *